United States Patent
Hars et al.

(10) Patent No.: US 9,037,624 B1
(45) Date of Patent: May 19, 2015

(54) USING MEMORY ACCESS TIMES FOR RANDOM NUMBER GENERATION

(75) Inventors: Laszlo Hars, Lafayette, CO (US); Monty Aaron Forehand, Loveland, CO (US); Donald Preston Matthews, Longmont, CO (US); Tong Shirh Stone, Eden Prairie, MN (US); Navneeth Kankani, Fremont, CA (US); Rodney Virgil Bowman, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 268 days.

(21) Appl. No.: 13/566,648

(22) Filed: Aug. 3, 2012

(51) Int. Cl.
*G06F 7/58* (2006.01)

(52) U.S. Cl.
CPC ........................... *G06F 7/582* (2013.01)

(58) Field of Classification Search
None
See application file for complete search history.

(56) References Cited

U.S. PATENT DOCUMENTS

| | | | |
|---|---|---|---|
| 5,067,156 A | 11/1991 | Martin | |
| 6,298,360 B1 | 10/2001 | Muller | |
| 6,766,312 B2 | 7/2004 | Landt | |
| 6,968,460 B1 * | 11/2005 | Gulick | 713/194 |
| 7,330,328 B2 | 2/2008 | Xie | |
| 7,334,009 B2 | 2/2008 | Henry et al. | |
| 7,631,195 B1 | 12/2009 | Yu | |
| 7,660,944 B2 | 2/2010 | Luo | |
| 7,949,698 B2 | 5/2011 | Janke | |
| 8,015,224 B1 * | 9/2011 | Chaichanavong et al. | 708/254 |
| 8,726,041 B2 * | 5/2014 | Hatakeyama | 713/193 |
| 2008/0279370 A1 * | 11/2008 | Hatakeyama | 380/30 |
| 2009/0077147 A1 | 3/2009 | Hars | |
| 2010/0109660 A1 | 3/2010 | Wang et al. | |
| 2013/0124591 A1 * | 5/2013 | Buch et al. | 708/251 |

* cited by examiner

*Primary Examiner* — David H Malzahn
(74) *Attorney, Agent, or Firm* — Cesari & Reed LLP; Kirk A. Cesari; Christian W. Best

(57) ABSTRACT

The disclosure is related systems and methods for using operation durations of a data storage medium to generate random numbers. In one embodiment, a device may comprise a random number generator circuit configured to store a value representing a duration of an operation on the data storage medium, and generate a random number based on the value. Another embodiment may be a method comprising recording durations of access operations to a data storage medium, and generating a random number based on the durations.

20 Claims, 4 Drawing Sheets

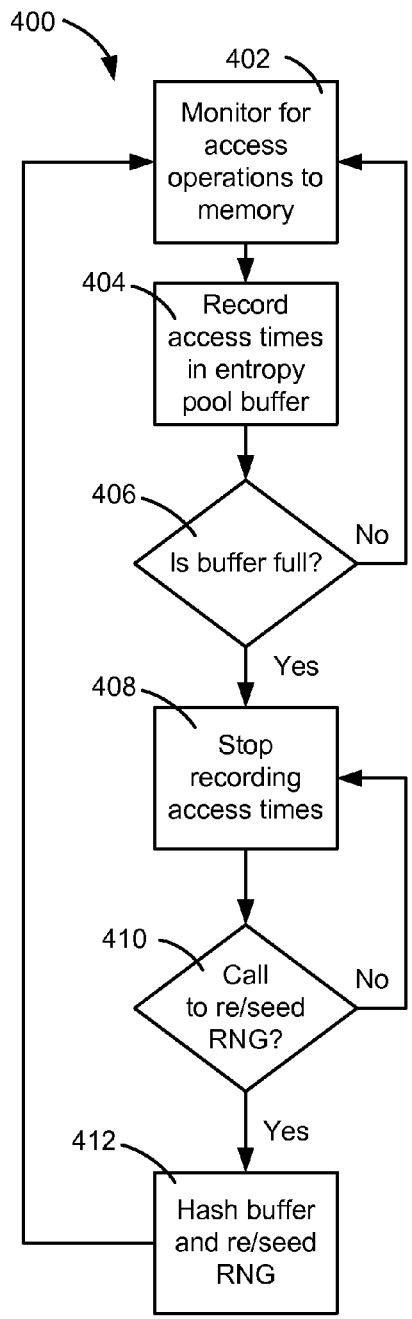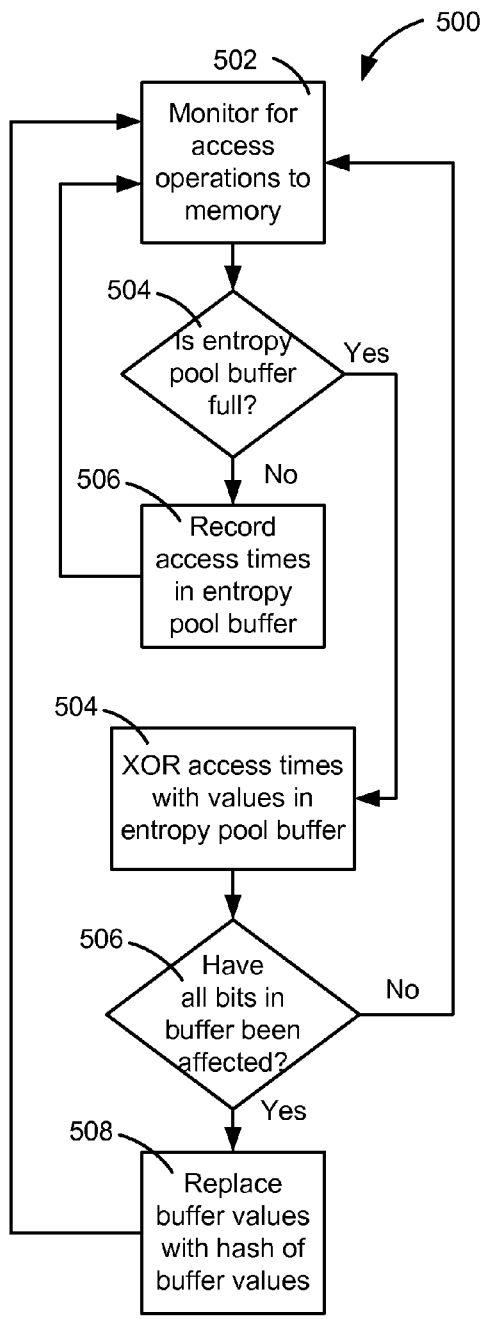
FIG. 4  FIG. 5

USING MEMORY ACCESS TIMES FOR RANDOM NUMBER GENERATION

BACKGROUND

Random numbers are useful for a variety of purposes, such as simulating phenomenon for studies, gambling or other gaming, or selecting random samples from a set of values. One field where random numbers with high unpredictability is required is data security, such as for generating encryption keys or tweak values.

Computers have a limited ability to generate random numbers. Computers are designed to rigidly follow a set of instructions, and are therefore very predictable. Predictability in a computing system, especially in relation to data security and encryption, can create vulnerabilities. Therefore, systems and methods are needed for improving methods of random number generation.

SUMMARY

A device may comprise a data storage medium and a random number generator circuit configured to store a value representing a duration of an operation on the data storage medium, and generate a random number based on the value.

In another embodiment, a random number generator may comprise a circuit configured to store a first value representing a duration of an operation on a data storage medium, and generate a random number based on the first value.

Another embodiment may be a method comprising recording durations of access operations to a data storage medium, and generating a random number based on the durations.

BRIEF DESCRIPTION OF THE DRAWINGS

FIG. 4 is a flowchart of an illustrative embodiment of a method for using memory access times for random number generation; and FIG. 5 is a flowchart of another illustrative embodiment of a method for using memory access times for random number generation.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Computing devices may have need to generate random numbers for a variety of reasons; e.g. to generate cryptographic keys to encrypt data. Computers may generate random numbers using different techniques, broadly categorized as pseudo-random number generators (PRNGs) and true random number generators (TRNGs).

When using a PRNG, a computer may be given input(s) called a "seed," and can use this seed along with an algorithm to produce a sequence of numbers that appear random. However, this method is 'deterministic' in that given the same seed, the PRNG will always produce the same set of numbers, which makes the set of numbers predictable. PRNGs can be useful when a large set of numbers is required quickly, as a PRNG can produce large sets of numbers with a small amount of inputs.

True random number generators (TRNGs), on the other hand, can extract randomness from observed physical phenomenon and convert it to a numerical output. For example, a computer that was programmed to roll a die and record the result could be considered a TRNG. If the observed physical phenomenon is truly random, then the corresponding TRNG number outputs should be nondeterministic; that is, one cannot predict a set of results ahead of time due to their direct reliance on a random physical occurrence. TRNGs are not as efficient as PRNGs at producing large quantities of data due to a reliance on observable physical phenomenon, but they are more unpredictable and therefore more secure.

The systems and methods disclosed herein could be used for either PRNGs or TRNGs. A system may be designed to observe the access time of various operations to a data storage medium. The time required to access or perform various operations to a data storage medium can vary by minute unpredictable durations. These minute variations can be used to generate random numbers, either by seeding a PRNG or by being converted directly into random number outputs by a TRNG.

Figure 1:
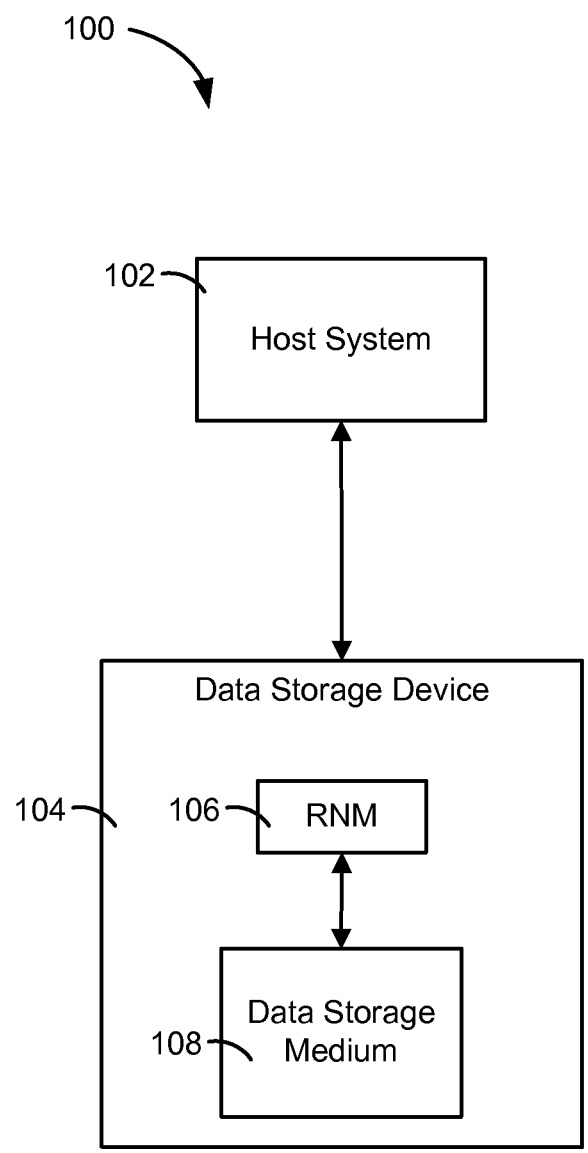
FIG. 1 is a diagram of an illustrative embodiment of a system using memory access times for random number generation.

FIG. 1 depicts an embodiment of a system 100 configured for using memory access times for random number generation. The system 100 may include a host 102 and a data storage device (DSD) 104. The host 102 may also be referred to as the host system or host computer. The host 102 can be a desktop computer, a laptop computer, a server, a tablet computer, a telephone, a music player, a gaming system, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

In some embodiments, the DSD 104 can include a random number module (RNM) 106 and a data storage medium 108. The data storage medium 108 may be any type of medium used to store digital data. Possible data storage mediums 108 may include volatile memory, which requires power to maintain stored information, such as some types of random access memory (RAM), including dynamic RAM (DRAM) and static RAM (SRAM). Data storage mediums may also include nonvolatile memory, which can store information without a constant power source, such as read-only memory (ROM), electrically erasable programmable read-only memory (EEPROM), Flash memory, and non-volatile random access memory (NVRAM). Possible data storage mediums 108 can also include memory with moving mechanical parts, such as hard discs and optical discs, as well as memory without moving components like most solid-state memory.

The random number module (RNM) 106 may be a circuit, controller, or system of components configured to monitor a duration of accesses to the data storage medium 108, and use the duration to generate a random number. The RNM 106 may employ a high-speed counter to measure the duration of read, write, or erase operations on the data storage medium 108, and use the duration to generate random numbers. Including a RNM 106 may be useful in a data storage device 104 configured to encrypt data independently from a host 102. The RNM 106 or components or operations thereof can be located in the host 102 or distributed between a host 102 and a data storage device 104.

Operations on data storage mediums, such as reads and writes, require small amounts of time to perform (e.g. seconds or milliseconds). Access times to different types of data storage mediums may be slower or faster, with mechanical-based memory such as hard discs tending to be slower, and solid state memory without moving mechanical components tending to be faster. There are minute variations between different accesses to the even same data storage medium, which variations can be detected by high-speed counters. Even memory such as solid-state Flash memory displays minute access time variations due to asynchronous clocks and their drift, different error correction and decompression computations, mapping paths, etc. As data storage mediums are used and components receive wear, access time variations may become more pronounced in a manner unique to each drive and the data usage thereon. The differences in the values of these access time durations provide unpredictable physical randomness that can be used to generate true random numbers, or as seeds to generate pseudo-random numbers. The high-speed counter of the RNM 106 may need to be fast enough to register the small variations in access times to the data storage medium 108.

Figure 2:
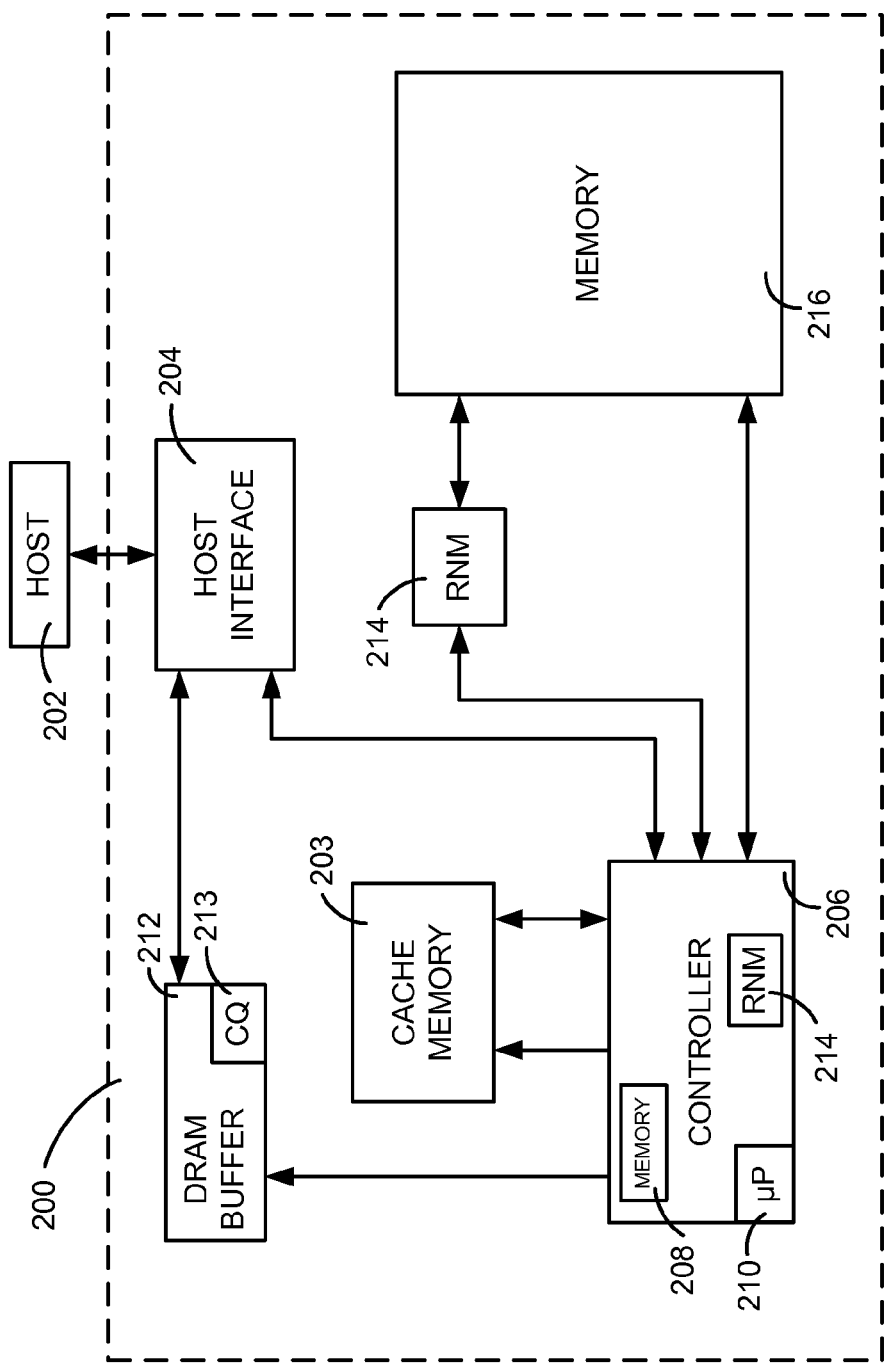
FIG. 2 is a diagram of another illustrative embodiment of a system using memory access times for random number generation.

FIG. 2 is a diagram of another illustrative embodiment of a system using memory access times for random number generation, generally designated 200. Specifically, FIG. 2 provides a functional block diagram of a data storage device (DSD) 200. The DSD 200 may be a data storage device such as the device 104 shown in FIG. 1. The data storage device 200 can communicate with a host device 202 (such as the host system 102 shown in FIG. 1) via a hardware/firmware based host interface circuit 204 that may include a connector (not shown) that allows the DSD 200 to be physically removed from the host 202. The DRAM buffer 212 can temporarily store user data during read and write operations and can include a command queue (CQ) 213 where multiple pending access operations can be temporarily stored pending execution. The DSD 200 may include a data storage medium 216, which may function as a primary memory. The data storage medium 216 may be any kind of data storage medium, such as Flash memory or a magnetic disc. A cache memory 203, such as DRAM or Flash memory, can be included for additional cache or buffer memory, or to provide additional addressable data storage for the DSD 200.

The DSD 200 can include a programmable controller 206 with associated memory 208 and processor 210. In some embodiments, the controller 206 may also include a random number module (RNM) 214, or elements to perform one or more functions described for a RNM herein, such as measuring the duration of operations performed on a data storage medium and using the duration values to produce random numbers. In some embodiments the RNM 214 can be one or more components located external to the controller 206, such as being operably coupled to the controller 206 and the memory 216. The RNM 214 may be located in the host 202 in some embodiments. Some embodiments may have functionality distributed among the components, such as the controller measuring the duration of I/O operations to the memory 216, with the RNM 214 storing the values, making any modifications or tweaks to the duration values, and using the values to generate a random number. Further, the RNM 214 may be implemented as one or more circuits, internal or external to a controller chip.

Figure 3:
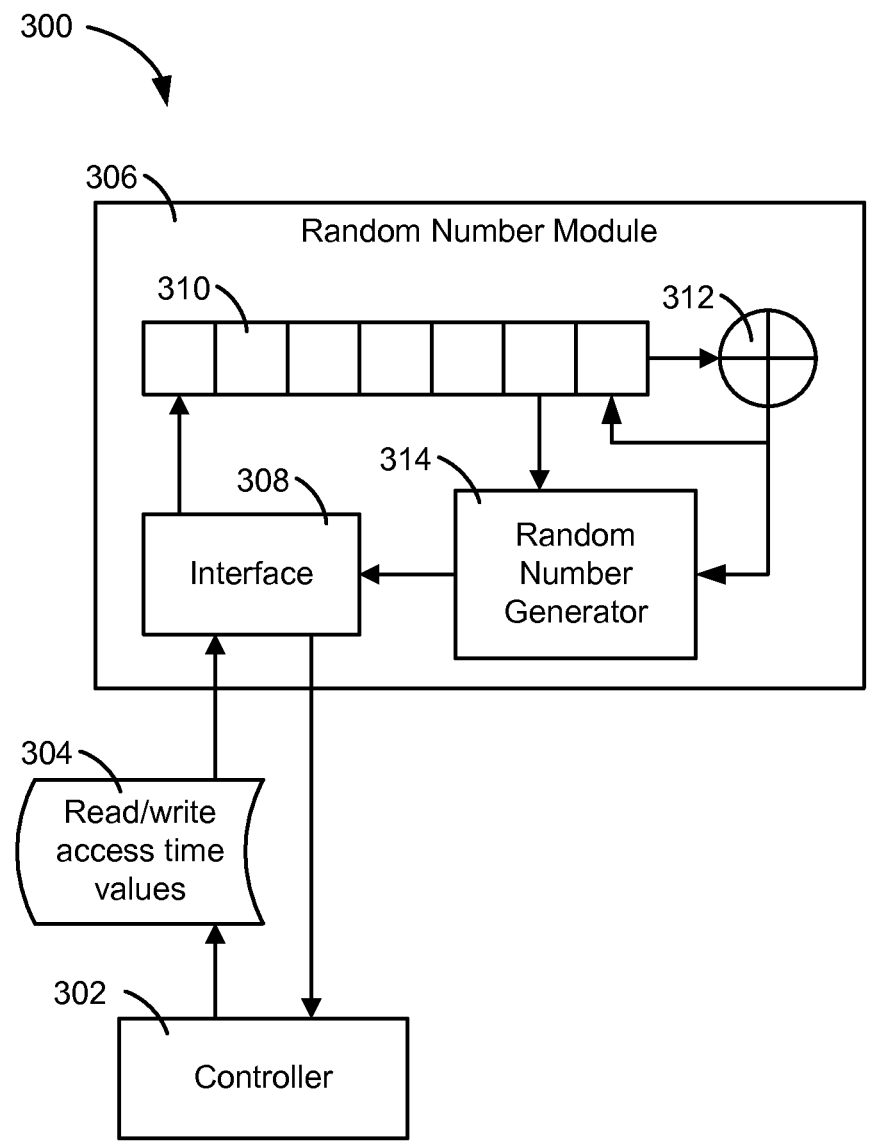
FIG. 3 is a diagram of another illustrative embodiment of a system using memory access times for random number generation.

FIG. 3 depicts a diagram of a system for using data access times for random number generation, generally designated 300. The system 300 may include a controller 302 (e.g. the controller 206 in FIG. 2), and a random number module (RNM) 306 (e.g. the RNM 214 in FIG. 2). The RNM 306 may include an interface 308 for sending and receiving data, an entropy pool buffer 310, and a random number generator 314. In the embodiment depicted in FIG. 3, the controller 302 measures the duration of accesses to a memory, such as the duration of read, write, or erase operations. The controller can pass these access time values 304 to the RNM 306 via the interface 308. In other embodiments, the RNM 306 may receive the access time values 304 directly from a counter, or the RNM 306 may include a counter to monitor access times independent of external components.

The RNM 306 may store the access time values 304 in the entropy pool buffer 310, sometimes referred to herein as the "entropy pool" or the "buffer". As used herein, "entropy" refers to randomness or uncertainty, and the entropy pool 310 can store the unpredictable duration values of accesses to memory. In some embodiments, the access time values 304 may alternately be stored in any memory location, and the RNM 306 may not involve a dedicated entropy pool buffer 310. Therefore in some embodiments, "entropy pool buffer," "entropy pool," and "buffer" may refer to a memory device.

The access time values 304 can be values measured by a high speed counter, and represent the duration of accesses to a data storage medium; e.g. how long a write operation took. The counter values of access time durations can show randomness. The values 304 measured by the counter may represent actual time elapsed (e.g. milliseconds or microseconds), or the values may represent computer cycles or "clock ticks" (e.g. 66 million 'ticks' or cycles per second on a 66 MHz system) elapsed, or other artificial "timing" mechanisms. Any counter may be used provided it can capture the minute variations of memory access durations. In some embodiments, the counter values may be in the form of a sequence of bits, and at least the few least-significant bit positions of the counter values can show randomness and are unpredictable. The most-significant bits may be less likely to show variation. The access time values 304 may represent the entire counter value, or a given number of least-significant bits of a counter value.

The access time values 304 may be placed into the entropy pool buffer 310. The buffer may be of a set size; e.g. 32 bits or 128 bits. The buffer may be stored on a specific physical memory of the RNM 306, or it may be stored to an external memory, such as the cache memory 203 or main memory 216 of FIG. 2. The buffer 310 can be configured to store one or more access time values 304. Multiple access time values 304 may be based on the durations of multiple different memory accesses. A buffer 310 designed to store multiple access time values 304 may have the values placed into the buffer in any manner. For example, a buffer of size N may be filled starting from buffer position 0 and continuing until reaching position N−1. In some embodiments, the access time values 304 may be placed into the buffer 310 based on a hashing algorithm.

Once the entropy pool 310 reaches a threshold capacity, e.g. 100% full or 80% full, the RNM 306 may be configured to proceed in a variety of ways. In one embodiment, the RNM 306 may cease storing access time values 304 when the threshold is reached. When a new random value or a new seed is required, the values stored in the buffer 310 can be passed to the random number generator 314 and the buffer 310 can be emptied. Once emptied, the entropy pool can resume receiving new access time values to repopulate the buffer.

In another embodiment, once the buffer 310 reaches a threshold capacity the RNM 306 may combine subsequent access time values 304 with the values already stored in the buffer 310. This may be done in a variety of ways, such as by performing exclusive or (XOR) operations between the new data and the data currently stored in the buffer 310. This can be performed as the new values arrive, or new values could be stored in a second buffer, and the second buffer can be XORed into the entropy pool buffer 310 when the second buffer reaches a threshold capacity. In another embodiment, the new access time values 304 may be hashed into the buffer 310 and the value of the stored bits can be switched when a collision occurs. Once every bit has been changed, the entire buffer may be re-hashed to modify the order of the stored bits via hashing algorithm 312. In some embodiments, the entropy pool 310 may not get emptied, but instead the stored values can be continually modified as new access time values 304 are processed.

The RNM 306 may collect access time values 304 in the entropy pool buffer 310 and store them until a call for a new random number or seed is needed. In other embodiments, the RNM 306 may be configured to only populate the entropy pool buffer 310 when a request is made for a random number or seed, and pass the contents of the buffer 310 when a threshold capacity is reached. In some embodiments, the RNM 306 may pass the contents of the entropy pool 310 to the random number generator 314 when a threshold capacity is reached, without the need to receive a request for a random number or seed.

When passing the contents of the entropy pool 310 to the random number generator 314, the RNM 306 may modify the contents of the buffer 310 via an algorithm or modifier at 312. For example, the RNM 306 may hash the contents of the buffer 310 to reorganize the stored values. In some embodiment, the contents of the buffer 310 may be combined (e.g. by XOR or other hashing combination) with a value, such as a drive-specific serial number or defect mappings, to provide a unique tweak. This may be useful when dealing with a new drive or data storage device that has not received much wear and may provide limited access time variations. In some embodiments, the random number generator 314 may have its own buffer, and the contents of the entropy pool buffer can be combined (e.g. by XOR) with or replace the contents of the random number generator buffer.

The random number generator 314 may have its own RNG buffer to receive the data from the entropy pool buffer 310, modified by any additional operations 312, or the RNG 314 may produce a random value without the need to store the data from the entropy pool 310. The random number generator (RNG) 314 may be a true random number generator (TRNG), a pseudo-random number generator (PRNG), or may be configured to function as either a TRNG or a PRNG depending on what the random numbers will be used for, or the required quantity of random numbers.

A TRNG may use the data from the entropy pool 310 to produce one or more random number outputs. This may involve modifying or altering the entropy pool contents into a desired format for the random numbers (e.g. integers, or numbers within a range). True random numbers produced in this fashion would provide a high degree of unpredictability and security for encryption purposes. However, a TRNG may not be able to produce number outputs as quickly as a PRNG, due to the TRNG requiring more physical randomness inputs to generate random number outputs.

A PRNG may use the data from the entropy pool 310 as one or more seeds to enter into an algorithm or table which outputs a sequence of pseudo-random numbers. Pseudo-random numbers produced in this fashion may not be as secure or random as true random numbers, because imputing the same seed may always result in the same sequence of generated pseudo-random numbers. PRNGs can produce a high quantity of pseudo-random number outputs from a single seed, however, which means a PRNG can produce greater output on fewer inputs than a TRNG.

The random number generator 314 may pass generated outputs to the interface 308, which may in turn pass them to the controller 302 or other component for use in processing, encrypting, etc. In some embodiments, the access time values 304 and the RNM 306 may be implemented completely internally to a data storage device, such that a host or external interface does not have any access to the values 304, the RNM 306, or any output of the RNM 306.

Turning now to FIG. 4, a flowchart of an illustrative embodiment of a method for using memory access times for random number generation is shown and generally designated 400. The depicted method can be used in a system employing a random number module, such as the systems depicted in FIGS. 1-3. The method 400 can involve monitoring for data accesses to a data storage medium, such as read, write, or erase operations, at 402.

When access operations are detected, the duration of the access may be recorded in an entropy pool buffer, at 404. This may involve recording a duration value in the form of a sequence of bits, and it may involve recording the entire duration bit string, or a set number of least-significant bits. The duration values may be recorded to the buffer in any manner. For example, the buffer may use address tables to locate and place data, or the buffer may be a data array which can be filled from one end to the other, "pushing" the bits in at one end only, or placing the bits into the buffer by means of a hashing algorithm.

The method 400 may involve checking if the buffer has reached a threshold capacity, such as 100% filled or 80% filled, at 406. If the threshold capacity has not been reached, the method 400 may involve continuing to monitor for new access operations, at 402. If the buffer has reached the threshold capacity and is therefore "full," the method 400 may direct that new access duration values not be recorded to the entropy pool buffer, at 408.

The method may monitor for a call to seed or reseed a random number generator (RNG), at 410. The phrase "seed" may include seeding a pseudo-random number generator, or passing recorded values to a true random number generator. If there is no need to seed or reseed a RNG, the method 400 may continue directing that no new access operation durations be recorded, at 408.

When a call to seed or reseed a RNG is detected, the values stored in the entropy pool buffer may be passed to the RNG at 412. Passing the buffer values to the RNG may also involve modifying the values in some manner, such as XORing the buffer values with another value, or hashing the buffer to reorder the stored values. The entropy pool buffer may also be cleared at 412, and new duration values may resume recording at 402.

Other methods may also be employed. For example, rather than awaiting a call to seed or reseed a RNG, the values in the entropy pool buffer may get passed to the RNG as soon as the entropy pool buffer becomes filled.

FIG. 5 depicts another example embodiment of a method for using memory access times for random number generation, generally designated 500. The method may involve monitoring for accesses to a memory, at 502.

The method 500 may involve checking if an entropy pool buffer is full of access duration values, at 504. If not, the duration value of a current access operation may be recorded to the buffer, at 506, and then the method 500 may involve continuing to monitor for memory accesses, at 502. If the buffer is full at 504, the method 500 may involve combining the new memory access duration with values already in the buffer, e.g. by exclusive OR (XOR), at 504. New values may be combined with the existing buffer values in any manner, such as by combining from one end of the buffer array to the other or by using a hashing algorithm.

The method may involve monitoring whether all bits in the buffer have been affected by a combination, at 506. For example, the method may involve monitoring whether every bit in the buffer has undergone an XOR combination, whether or not the value of the bit has changed. In some embodiments, a set amount of least-significant bits of duration values is recorded (e.g. 4 bits from a counter for each memory access operation), and the buffer may therefore get XORed in sets of 4 bits at a time instead of one bit at a time. If all bits have not yet been affected, the method 500 may continue monitoring for new memory accesses, at 502. If all bits have been affected, the method 500 may involve replacing the buffer values with a hash of the buffer values. For example, this may mean running the entire buffer through a hashing algorithm that results in the bits being "shuffled." This can add additional randomness. Monitoring for access operations may then resume at 502.

The method of FIG. 5 involves a constantly shifting entropy pool buffer whether or not the values in the buffer are ever flushed. The values may be used to seed or reseed a random number generator at any point where the buffer is full enough for the seed or reseed operation. The values in the buffer may get emptied during a seed or reseed operation, or the buffer may retain the stored values. In some embodiments, the buffer may be emptied periodically regardless of seeding operations; e.g. after a timer expires, or after a number of memory access operations has occurred, both of which could vary to provide more unpredictability.

In accordance with various embodiments, the methods described herein may be implemented as one or more software programs running on a computer processor or controller. In accordance with another embodiment, the methods described herein may be implemented as one or more software programs running on a computing device, such as a personal computer that is using a data storage device. Dedicated hardware implementations including, but not limited to, application specific integrated circuits, programmable logic arrays, and other hardware devices can likewise be constructed to implement the methods described herein. Further, the methods described herein may be implemented as a computer readable storage medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
a data storage medium;
a random number generator circuit configured to:
monitor for a data access operation to the data storage medium, including monitoring for read operations and write operations;
measure a duration of the data access operation;
store a value representing the duration of the data access operation; and
generate a random number based on the value.

2. The device of claim 1, further comprising:
an interface circuit to communicate with a host external to the device, the interface allowing the device to be physically removed from the host.

3. The device of claim 2, wherein the random number generator circuitry is further configured to monitor for erase operations.

4. The device of claim 1, wherein the random number generator circuit comprises a controller configured to execute a set of instructions for random number generation.

5. The device of claim 1, wherein the duration of the data access operation is represented as a plurality of bits, and wherein the value represents a selected number of least significant bits from the plurality of bits.

6. The device of claim 1, wherein the random number generator circuit is further configured to:
store a plurality of values representing durations of a plurality of data access operations; and
generate the random number based on the plurality of values.

7. The device of claim 6, wherein the random number generator circuit is further configured to:
store the plurality of values in a buffer until the buffer reaches a capacity threshold; and
empty the buffer when the plurality of values is used to generate the random number.

8. The device of claim 6, wherein the random number generator circuit is further configured to:
store the plurality of values in a buffer until the buffer reaches a capacity threshold; and
combine subsequent values with the plurality of values in the buffer to modify the plurality of values in the buffer.

9. The device of claim 6, the random number generator circuit further configured to:
store the plurality of values in a buffer, the contents of the buffer representing a single seed value; and
generate a plurality of random numbers based on the single seed value.

10. The device of claim 1, wherein the random number generator circuit is further configured to store the value only after receiving a request for the random number.

11. The device of claim 1, wherein the random number generator circuit is further configured to generate a random number based on the value combined with a device serial number.

12. The device of claim 1 further comprising:
the data storage medium includes a nonvolatile solid-state memory.

13. An apparatus comprising:
a random number generator including:
a circuit configured to:
monitor for a data access operation to a data storage medium, including monitoring for read operations and write operations;
measure a duration of the data access operation;
store a value representing the duration of the data access operation; and
generate a random number based on the value.

14. The apparatus of claim 13, the circuit further configured to:
store a plurality of values representing durations of a plurality of operations on the data storage medium in a buffer until the buffer reaches a capacity threshold; and
generate the random number based on the plurality of values.

15. The apparatus of claim 13, the circuit further configured to generate a sequence of numbers based on the value by imputing the first value into a number generation algorithm.

16. The apparatus of claim 13, further comprising:
the duration of the data access operation is represented as a plurality of bits; and
the value represents a selected number of least significant bits from the plurality of bits.

17. A method comprising:
monitoring for data access operations to a data storage medium, including monitoring for different types of data access operations;
measuring durations of the data access operations;
storing values representative of the durations of the data access operations; and
generating a random number based on the values.

18. The method of claim 17 further comprising:
storing the values in a buffer until the buffer reaches a threshold capacity; and
emptying the buffer when the values are used to generate a random number.

19. The method of claim 17 further comprising:
storing the values in a buffer until the buffer reaches a threshold capacity; and
combining the values with the buffer using an exclusive OR operation after the buffer reaches a threshold capacity.

20. The method of claim 17 wherein the values comprise a selected number of least-significant bits of a plurality of bits representative of durations of operations to the data storage medium measured by a counter.

* * * * *